(12) United States Patent
Shah et al.

(10) Patent No.: US 8,407,711 B2
(45) Date of Patent: Mar. 26, 2013

(54) MAPE LOOP PERFORMANCE ON SYSTEM-WIDE BASIS

(75) Inventors: Punit B. Shah, Portland, OR (US); Billy R. Robinson, Coppell, TX (US); Francis M. Bartucca, Raleigh, NC (US); Carlos P. Sosa, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 12/172,245

(22) Filed: Jul. 13, 2008

(65) Prior Publication Data

US 2010/0011381 A1 Jan. 14, 2010

(51) Int. Cl.
*G06F 9/46* (2006.01)
(52) U.S. Cl. ........ 718/104; 718/105; 713/320; 713/340; 709/224
(58) Field of Classification Search .................. None
See application file for complete search history.

(56) References Cited

U.S. PATENT DOCUMENTS

| | | | |
|---|---|---|---|
| 4,747,041 A | 5/1988 | Engel et al. | |
| 6,504,817 B2 | 1/2003 | Oldfield et al. | |
| 7,441,135 B1 * | 10/2008 | Chan et al. | 713/320 |
| 2002/0049920 A1 * | 4/2002 | Staiger | 713/340 |
| 2006/0168194 A1 * | 7/2006 | Lake et al. | 709/224 |
| 2007/0226028 A1 | 9/2007 | Britton et al. | |
| 2007/0271225 A1 | 11/2007 | Labadie et al. | |
| 2008/0028246 A1 * | 1/2008 | Witham | 713/330 |
| 2008/0262890 A1 * | 10/2008 | Korupolu et al. | 705/8 |

OTHER PUBLICATIONS

M. Ruth et al., "PowerPlay: Exploring decision making behaviors in energy efficient markets," Technological Forecasting & Social Change 74 (2007).
Y. Li et al., "Service Ecosystem: A Resilient infrastructure for on demand services provisioning in grid," Procs. of IEEE Int'l Conf. on Web Services (2004).
Enterprise Management Associates, "Practical autonomic computing: Roadmap to self managing technology," White paper prepared for IBM, Jan. 2006.
P A.S. Ward et al., "Event-based self-management," University of Waterloo (Canada) Technical Report, 2005.
M. D. Krasniewski et al., "Energy-efficient, on-demand reprogramming of large-scale sensor networks," Purdue University Technical Report TR-ECE-06-02, Jan. 2006.
S. Rivoire et al., "JouleSort: A balanced energy-efficient benchmark," Procs. of SIGMOD, Jun. 11-14, 2007.
B. Khargharia et al., "Autonomic power and performance management for computing systems" Proceedings of Autonomic Computing, ICAC '06, IEEE Int'l Conf., Jun. 13, 2006.
PCT international search report and written opinion in corresponding PCT patent application PCT/EP2009/058191, mailed Aug. 18, 2009.

* cited by examiner

*Primary Examiner* — Emerson Puente
*Assistant Examiner* — Dong Kim
(74) *Attorney, Agent, or Firm* — Steven L. Bennett

(57) ABSTRACT

A manage-analyze-plan-execute (MAPE) loop is performed on a system-wide basis in relation to subsystems of a computing system based on one or more parameters. Performing the MAPE loop results in a performance level at which each subsystem is to operate to conserve energy utilization on the system-wide basis such that the computing system still satisfies the parameters. The subsystem the performance level at which each subsystem is to operate is communicated to the subsystem. Each subsystem operates at the performance level communicated to the subsystem.

19 Claims, 5 Drawing Sheets

MAPE LOOP PERFORMANCE ON SYSTEM-WIDE BASIS

FIELD OF THE INVENTION

The present invention relates generally to performing a manage-analyze-plan-execute (MAPE) loop, and more particularly to performing such a MAPE loop on a system-wide basis in relation to a number of subsystems of a computing system, specifically for energy conservation purposes.

BACKGROUND OF THE INVENTION

An autonomic computing system is a computing system that senses its operating environment, models its behavior within that environment, and takes actions to change the environment or its own behavior. Autonomic computing systems are typically self-configuring, self-healing, self-optimizing, and self-protecting. They are self-configuring in that such systems have characteristics that enable them to adapt to changing conditions by changing their own configurations, and have functionality that permits the addition and removal of components or resources within the system without service disruption.

Autonomic computing systems are self-healing in that they have the capacity to recognize and diagnose deviations from normal conditions and to take actions to normalize the conditions, as well as the capability to proactively circumvent issues that could cause service disruptions. Such computing systems are self-optimizing in that they have the ability to monitor their state and performance and proactively tune themselves to respond to environmental stimuli. Autonomic computing systems are self-protecting in that they incorporate intelligence to recognize and circumvent security threats, and have the facility to protect themselves from physical harm, such as excessive heat or motion.

Figure 1:
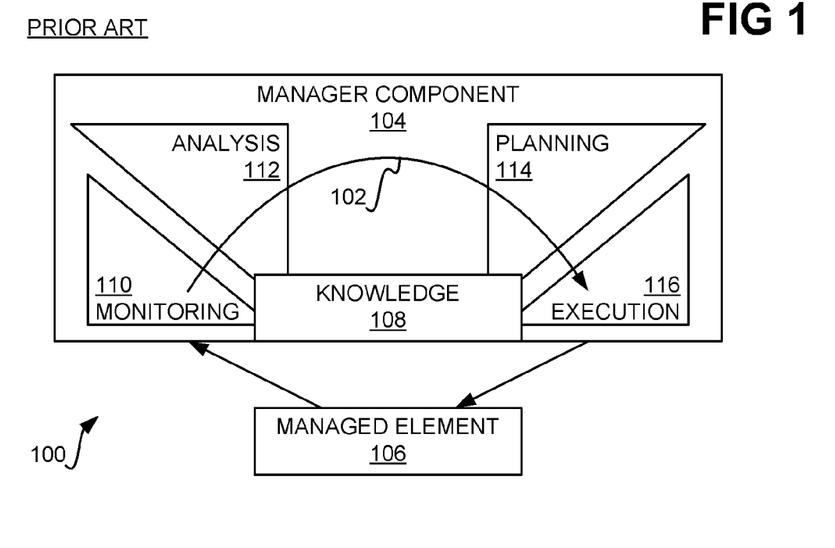
FIG. 1 is a diagram of an architecture in relation to which a manage-analyze-plan-execute (MAPE) loop is performed, in accordance with the prior art.

FIG. 1 shows the architecture 100 of an aspect that is present in some autonomic computing systems within the prior art, a monitor-analyze-plan-execute (MAPE) loop 102. A manager component 104 performs the MAPE loop 102 in relation to a managed element 106 of a computing system. Based on knowledge 108, the manager component 104 performs four actions: monitoring 110, analysis 112, planning 114, and execution 116. It is noted that the MAPE loop 102 is not performed within the prior art for an autonomic computing system as a whole, on a system-wide basis, but rather is performed individually for each subsystem, or managed element, like the managed element 106.

The monitoring 110 includes receiving one or more events from or regarding the managed element 106. The analysis 112 includes correlating and analyzing these events to determine if a specific known situation exists. The planning 114 includes determining how, if such a situation does exist or is otherwise detecting, the situation should be processed or handled via determining one or more actions. The execution 116 thus includes the managed element 106 performing these actions that have been determined.

Figure 2:
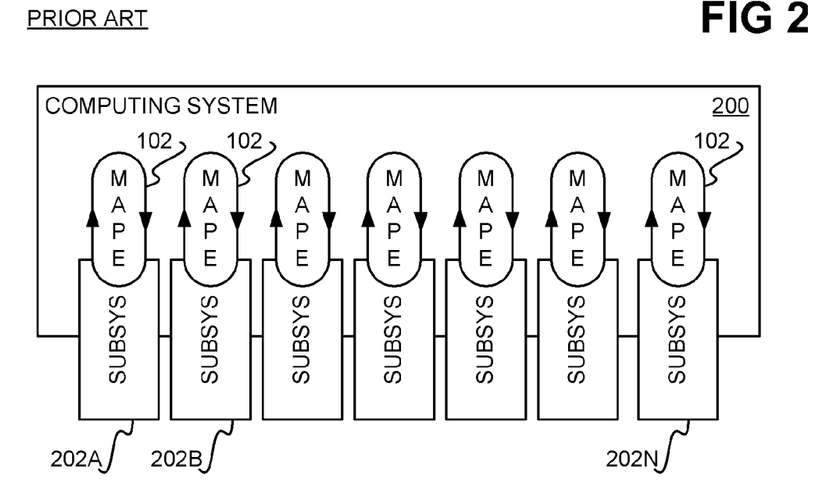
FIG. 2 is a diagram of a computing system in which a MAPE loop is performed on a subsystem-by-subsystem basis, in accordance with the prior art.

FIG. 2 shows how the MAPE loop 102 is performed on a subsystem level within an autonomic computing system 200, in accordance within the prior art. The computing system 200 includes a number of subsystems 202A, 202B, . . . , 202N, collectively referred to as the subsystems 202. A MAPE loop 102 is performed at or for each subsystem 202, on a subsystem-by-subsystem basis, where each subsystem 202 can be considered a managed element 106 as in FIG. 1. Thus, each subsystem 202 has the MAPE loop 102 performed as to itself, and not in relation to the other subsystems 202 of the computing system 200.

Such individual performance of the MAPE loop 102 on a subsystem-by-subsystem basis is problematic, however. Individual MAPE loops 102 may make wrong decisions as to what actions for the subsystems 202 to take because they are not informed by events occurring at all the other subsystems 202. For example, a MAPE loop for a processor subsystem may determine that the subsystem should step down its performance level to save energy, even though other subsystems 202 have determined that there are processes which will soon require significant processing time by the processor subsystem. Thus, as soon as the processor subsystem steps down its performance level, it may then be requested to immediately perform processing activity, such that the subsystem may immediately have to step back up its performance level to handle these requests. This can be problematic, because it may take time for the processor subsystem to step back up its performance level once the performance level has been stepped down.

Furthermore, individual performance of the MAPE loop 102 on a subsystem-by-subsystem basis can result in undesirable latency effects that cause performance degradation and energy conservation degradation as to the computing system 200 a whole. For example, all the subsystems 202 may have stepped their performance level down due to minimal activity being performed by the system 200. Requests that will result in significant activity to be performed by the system 200 as a whole may then be received by a front-tier subsystem. Ideally, once the front-tier subsystem receives these requests, all the subsystems 202 immediately step up their performance levels in anticipation of the requests travelling from the front-tier subsystem, to the middle-tier subsystems, and finally to the back-end subsystems.

However, where the MAPE loop 102 is individually performed on a subsystem-by-subsystem basis, this cannot occur. Rather, the front-tier subsystem first steps up its performance level in response to its own MAPE loop 102 being performed, which takes time before the front-tier subsystem can adequately process the requests. When the requests are transferred to each tier subsystem down the line, this process is repeated, with the tier subsystems having to step up their performance levels sequentially until they are able to adequately process the requests. Where each of N subsystems 202 has the same latency n to step its performance level back up after performance of its MAPE loop 102, this means that processing a request after all the subsystems 202 previously have had their performance levels stepped down results in a delay of N times n, which can be significant. That is, the latency n ripples across the N subsystems 202 sequentially. The ideal case, by comparison, is that all the relevant subsystems 202 are stepped up at the same time, so that just a latency n occurs overall.

The same latency ripping occurs in the reverse situation within the prior art as well. When all the subsystems 202 are operating at stepped-up performance levels, the back-tier subsystem may first step its performance level down in response to less activity being performed, as detected by the MAPE loop 102. Responsive to this, each middle-tier subsystem in sequence may then step its performance level down, until finally the front-tier subsystem steps its performance level down. As before, where each of N subsystems 202 has the same latency n to step its performance level back down after performance of its MAPE loop 102, this means that reaching an energy-efficient state for the computing system 200 as a whole results in a delay of N times n, because the latency n ripples across the N subsystems 202 sequentially. The ideal case is again that all the relevant subsystems 202 are stepped down at the same time, so that just a latency n occurs overall.

SUMMARY OF THE INVENTION

The present invention relates to performing a manage-analyze-plan-execute (MAPE) loop on a system wide basis. In a method of an embodiment of the invention, a MAPE loop is performed on a system-wide basis in relation to a number of subsystems of a computing system based on one or more parameters. Performing the MAPE loop results in a performance level at which each subsystem is to operate to conserve energy utilization on a system-wide basis such that the computing system still satisfies the parameters. The performance level at which each subsystem is to operate is communicated to the subsystem. Each subsystem operates at the performance level communicated to the subsystem.

A computing system of an embodiment of the invention includes a number of subsystems and a manger component. At least one of the subsystems is implemented in hardware. The manager component is to perform a MAPE loop on a system-wide basis in relation to the subsystems based on one or more parameters to result in a performance level at which each subsystem is to operate to conserve energy utilization on the system-wide basis such that the computing system still satisfies the parameters. The manager component is to communicate to each subsystem the performance level at which the subsystem is to operate. Each subsystem is then to operate at the performance level communicated to the subsystem by the manager component.

A computing device of an embodiment of the invention includes hardware and a manager component implemented within the hardware. The manager component is to perform a MAPE loop on a system-wide basis in relation to a number of subsystems of a computing system based on one or more parameters. This results in a performance level at which each subsystem is to operate to conserve energy utilization on the system-wide basis such that the computing system still satisfies the parameters.

An article of manufacture of an embodiment of the invention includes a tangible computer-readable medium, such as a recordable data storage medium, and means in the medium, such as one or more computer programs that can be executed by one or more processors of one or more computing devices. The means is for performing a MAPE loop on a system-wide basis in relation to a number of subsystems of a computing system based on one or more parameters. Performing the MAPE loop results in a performance level at which each subsystem is to operate to conserve energy utilization on the system-wide basis such that the computing system still satisfies the parameters.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 3:
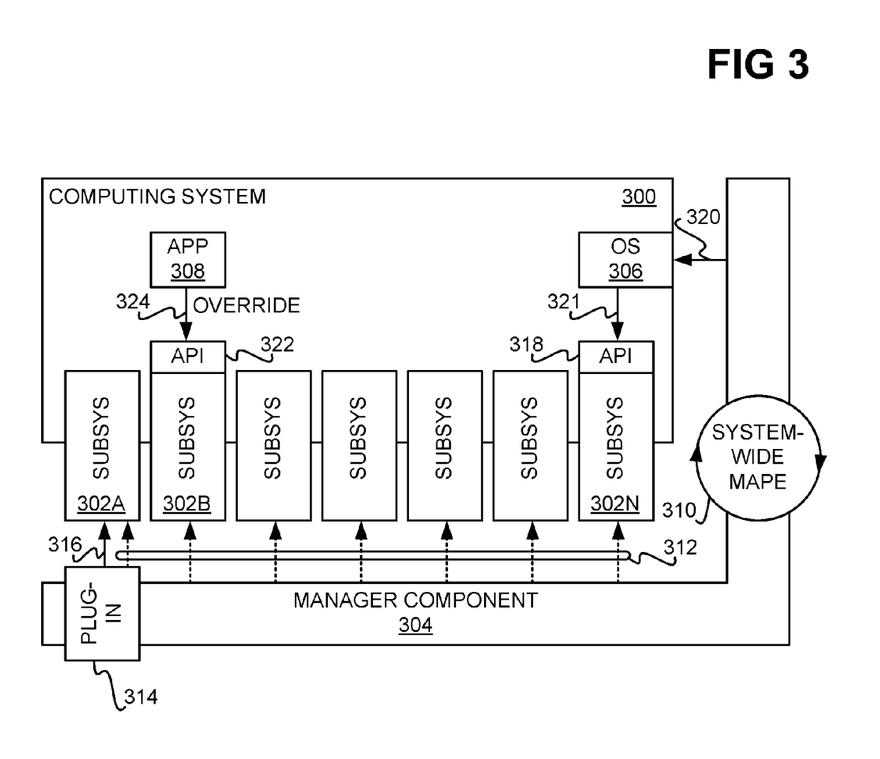
FIG. 3 is a diagram of a computing system in which a MAPE loop is performed on a system-wide basis, according to an embodiment of the present invention.

FIG. 3 shows a computing system 300, according to an embodiment of the invention. The computing system 300 may be an autonomic computing system, and thus may be self-configuring, self-healing, self-optimizing, and/or self-protecting, as has been described above in the background section. The computing system 300 includes a number of subsystems 302A, 302B, . . . , 302N, collectively referred to as the subsystems 302. The subsystems 302 may each be implemented in hardware, software, or a combination of hardware and software. Typical examples of such subsystems 302 include individual computing device components or devices, entire computing devices like server devices, storage subsystems, processor subsystems, networking subsystems, as well as other types of subsystems.

There is a manager component 304, which may be implemented in software, hardware, or a combination of software and hardware. The manager component 304 is depicted in FIG. 3 as being separate from the computing system 300, but in another embodiment the component 304 may be part of the computing system 300. The manager component 304 performs a monitor-analyze-plan-execute (MAPE) loop 310. Unlike within the prior art, however, in which a MAPE loop is performed for each subsystem on a subsystem-by-subsystem basis, as has been described in the background section, the MAPE loop 310 performed by the manager component 304 is performed on a system-wide basis, for all the subsystems 302 of the computing system 300. In one embodiment, the MAPE loop 310 is performed on a system-wide basis in the same manner as it is performed on a subsystem-by-subsystem basis as described in the background section, except for the fact that the MAPE loop 310 takes into account all the subsystems 302 as a whole and at least substantially at the same time.

The MAPE loop 310 is performed on the basis of knowledge, and more specifically one or more parameters, regarding the computing system 300 as a whole and/or regarding the individual subsystems 302 of the system 300. For example, these parameters can include the characteristics of a workload running on the computing system 300, and/or characteristics of an application computer program 308 running on the system 300. Other parameters include a required service level agreement (SLA) of the computing system 300, where the system 300 is managed by one party for another party such that the former party guarantees certain performance levels of the system 300 within such an SLA. Still other parameters include the topology of the computing system 300 (e.g., its individual constituent subsystems 302 and how they are connected to one another), the historical usage pattern of the system 300 (e.g., the system 300 may not be used as frequently at night as compared to during the day), workload priority, as well as any network of the system 300. The parameters may be user-specified.

Performance of the MAPE loop 310 results in a performance level at which each subsystem 302 is to operate to conserve energy utilization on a system-wide basis of the computing system 300, while still satisfying all the parameters in question. For example, if performance of the MAPE loop 310 determines that processing-centric activities are currently being performed with little storage device access, then processing subsystems may operate at 100% performance, while storage subsystems may operate at 50% performance, while still satisfying an SLA in relation to which the system 300 is operated. In general, the performance level at which a subsystem 302 should operate can be expressed in terms of a percentage of its highest performance capability, such as 0%, 25%, 50%, 75%, 100%, and so on. Furthermore, in general, higher performance levels typically equate to higher energy usage, such that to maintain energy efficiency, the subsystems 302 are directed to operate at performance levels commensurate with the activities that they are currently performing or will soon have to perform.

Because the MAPE loop 310 is performed as to all the subsystems 302 of the computing system 300 on a system-wide basis, more intelligent decisions as what the performance levels of the individual subsystems 302 should be can be made in comparison to the prior art, without latency ripple effects. For example, a processing subsystem may not currently be processing any requests, but a front-tier subsystem may have received a large number of requests that the processing subsystem may have to soon process. Within the prior art, a MAPE loop performed in relation to just the processing subsystem itself, on a subsystem-by-subsystem basis, may result in the processing subsystem being put in a low-performance level state to conserve energy, because the processing subsystem is unaware that it will soon be asked to process a large number of requests.

By comparison, within the computing system 300, the MAPE loop 310 performed in relation to all the subsystems 302 identifies that the processing subsystem will soon have to process a large number of requests, even though it is not currently performing much processing activity. Therefore, the result of the MAPE loop 310 is that the processing subsystem is not put into a low-performance level state, because the processing subsystem will soon be processing a large number of requests. Because the MAPE loop 310 is performed on a system-wide basis, in other words, it is aware of all the activities currently occurring at all the subsystems 302, and can specify performance levels for the individual subsystems 302 by taking into account this information. This is advantageous, as it ensures that performance degradation of the computing system 300 will not result by placing a subsystem into a low-power performance state only to immediately have to take the subsystem out of that state.

Furthermore, performance of the MAPE loop 310 on a system-wide basis precludes latency ripple effects. For example, if the subsystems 302 are all currently operating at all low performance levels, and a front tier subsystem receives a large number of requests, a latency ripple sequentially occurring throughout the subsystems 302 does not occur in the computing system 300 as in the prior art. This is because when the front tier subsystem receives a large number of requests, performance of the system-wide MAPE loop 310 can identify that all the subsystems 302 may have to soon operate at a high performance level. Therefore, all the subsystems 302 can be caused to operate at high performance levels at the same time. Rather than having a latency of N subsystems 302 times n latency for each subsystem, the result is there is just a latency of n to bring all the subsystems 302 back to the high performance level.

After the manager component 304 performs the single system-wide MAPE loop 310 for all the subsystems 302 (as opposed to individual MAPE loops for the subsystems 302 as in the prior art), the component 304 communicates to each subsystem 302 the performance level at which it should operate, as indicated by the dotted arrows 312. Each subsystem 302 then operates at the performance level that has been communicated to it by the manager component 304. Two different ways by which the performance levels can be communicated by the manager component 304 to the subsystems 302 are now described, in exemplary relation to the subsystems 302A and 302N.

First, as to the subsystem 302A, the manager component 304 has a plug-in 314 installed for the subsystem 302A. A plug-in can generally be considered as an auxiliary computer program that works with a primary computer program to enhance its capability. In this case, the plug-in 314 permits the manager component 304 to communicate the performance level at which the subsystem 302A should operate directly to the subsystem 302A. Thus, because the subsystem 302A has a plug-in 314 installed for the subsystem 302A at the manager component 304, the component 304 directly communicates the performance level at which the subsystem 302A should operate to the subsystem 302A via the plug-in 314, as indicated by the arrow 316.

Second, as to the subsystem 302N, the manager component 304 communicates the performance level at which the subsystem 302N is to operate to an operating system 306 of the computing system 300. An operating system can be considered the master control computer program of the computing system 300, and sets the standards for all application computer programs that run on the system 300, permitting the application computer programs to interface with the underlying subsystems 302. An example of an operating system is the LINUX™ operating system, for instance.

Installed at the operating system 306 is an application programming interface (API) 318 for the subsystem 302N by which the operating system 306 is able to specify the performance level at which the subsystem 302N is to operate. An API can be considered a language and message format used by one entity, such as the operating system 306, to communicate with another entity, such as the subsystem 302N. An API may be implemented via a function call. Thus, the operating system 300 takes the performance level at which the subsystem 302N is to operated, as communicated to it by the manager component 304 as indicated by the arrow 320, and calls the API 318 to pass this performance level to the subsystem 302N, as indicated by the arrow 321.

There may be certain situations in which application computer programs, such as the application computer program 308, may wish to override the performance levels of the subsystems 302 dictated by the manager component 304. For example, even though stepping down and stepping up performance levels of the subsystems 302 via performance of the system-wide MAPE loop 310 is achieved intelligently and with a minimum latency n, the application computer program 308 may decide that its execution is so important that even this minimum latency is too much to incur. Furthermore, the application computer program 308 may not be able to communicate this information to the manager component 304.

Therefore, in exemplary relation to the subsystem 302B, the application computer program 308 may call an API 322 of the subsystem 302B to override the performance level of the subsystem 302B dictated by the manager component 304. The API 322 may be the same API or a different API than the API that the operating system 306 may use to communicate the performance level at which the subsystem 302B is to operate from the manager component 304 to the subsystem 302B. When the application computer program 308 overrides the performance level of the subsystem 302B dictated by the manager component 304, the subsystem 302B may modify its performance level as suggested by the manager component 304 until the application computer program 308 itself tells the subsystem 302B otherwise.

Figure 4:
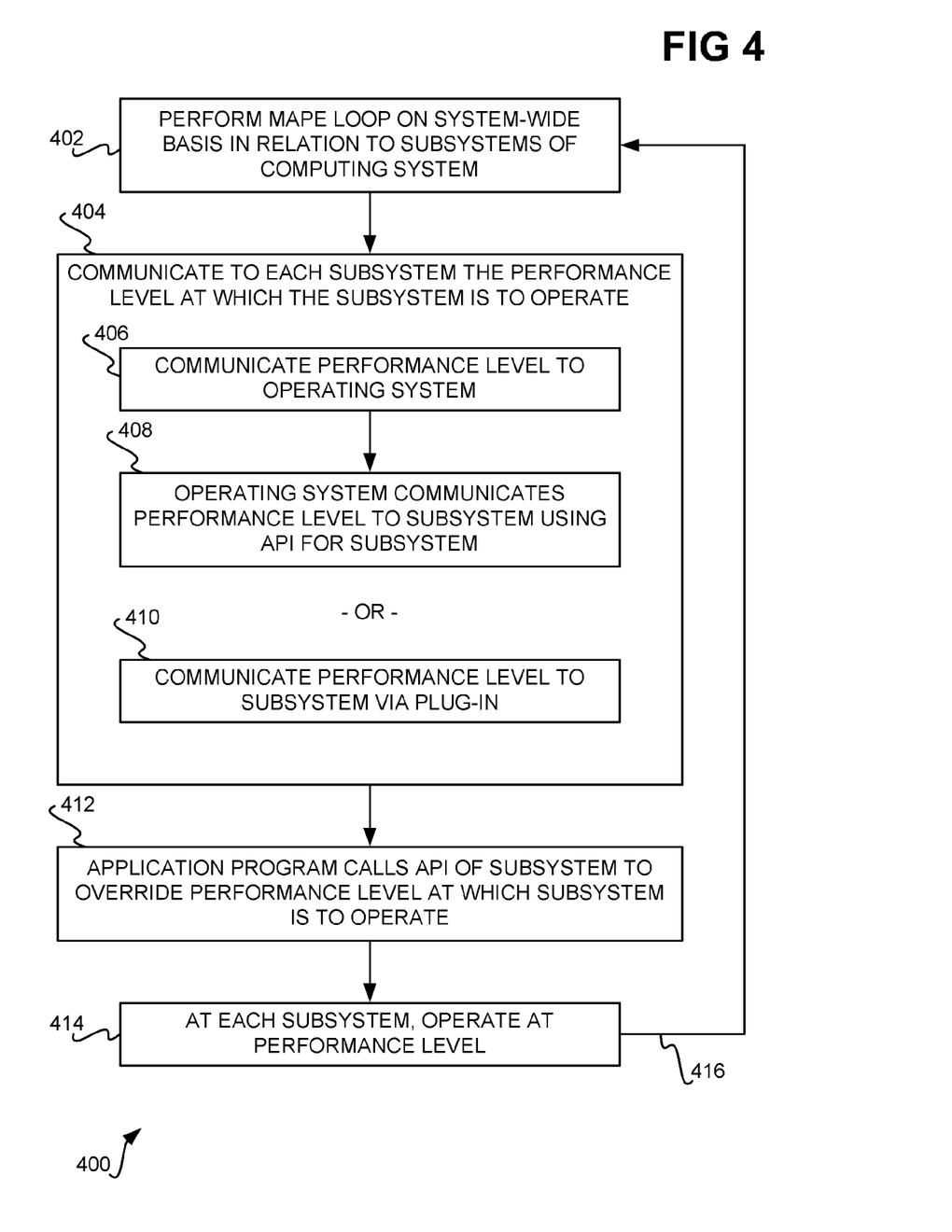
FIG. 4 is a flowchart of a method for conserving energy utilization on a computing system-wide basis by performing a MAPE loop on a system-wide basis, according to an embodiment of the present invention.

FIG. 4 shows a method 400 for conserving energy utilization by the computing system 300 by performing the system-wide MAPE loop 310, according to an embodiment of the invention. Most parts of the method 400 may be performed by the manager component 304, except where explicitly indicated to the contrary. The manager component 304 in this respect may include one or more computer programs stored on a tangible computer-readable medium, such as a recordable data storage medium, and executed by a processor. The computer programs in this respect may constitute a means for performing the functionality of the method 400 performed by the manager component 304.

The manager component 304 performs the MAPE loop 310 on a system-wide basis in relation to the subsystems 302 of the computing system 300, based on one or more parameters (402), as has been described. Performance of the MAPE loop results in a performance level at which each subsystem is to operate to conserve energy utilization on the system-wide basis, such that the computing system 300 as a whole is still able to satisfy the parameters in question. For instance, those subsystems 302 that can operate at lower performance levels while not unduly affecting performance of the computing system 300 may be operated at such lower performance levels to conserve energy utilization. By comparison, other subsystems 302 that have to operate at higher performance levels to guarantee a minimum performance of the system 300 may not be operated at lower performance levels.

The manager component 304 communicates to each subsystem 302 the performance level at which the subsystem 302 is to operate (404). In one embodiment, parts 406 and 408 can be performed to achieve such communication, whereas in another embodiment, part 408 can be performed to achieve such communication. In the former case, the performance level at which a given subsystem 302 is to operate is communicated to the operating system 306 (408), which communicates this performance level to the subsystem 302 in question via an API 318 for the subsystem 302. In the latter case, the performance level at which a given subsystem 302 is to operate is directly communicated by the manager component 304 to the subsystem 302 in question via a plug-in 314 for the subsystem 302 (410).

In some embodiments, an application computer program 308 can call an API 322 of a given subsystem 322 to override the performance level at which the subsystem 322 in question is to operate as communicated by the manger component 304 indirectly via parts 406 and 408 or directly via part 410 (412). Ultimately, then, each subsystem 322 operates at the performance level that has been communicated to it (414), either by the manager component 304 indirectly or directly, or as overridden by the application computer program 308. The method 400 can then be repeated one or more times beginning at part 402, as indicated by the arrow 416.

As has been described, embodiments of the invention can be performed in relation to computing systems 300 having different types of subsystems 302. One type of computing system 300 may have, for instance, a collection of server devices, storage subsystems implemented on separate or a collection of computing devices, and so on. In such instance, each server device and each subsystem may be considered one of the subsystems 302. In another embodiment, a computing system 300 may be a single computing device having a number of components, such as processors, memory, storage devices like hard disk drives, and so on. In such instance, each component may be considered one of the subsystems 302.

Figure 5:
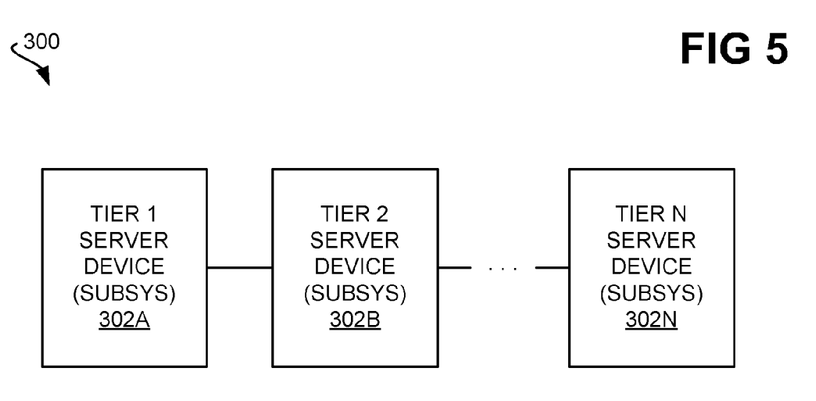
FIGS. 5 and 6 are diagrams of different computing system topologies in relation to which the computing system of FIG. 3 may be implemented and the method of FIG. 4 may be performed, according to varying embodiments of the present invention.

As to the former case, FIG. 5 shows a topology for a representative computing system 300, according to an embodiment of the invention. The subsystems 302 in FIG. 5 are each a server device. The server devices are organized in tiers, from a first- (or front-) tier subsystem 302A, to a second-tier subsystem 302B, and ultimately to a last- (or back-) tier subsystem 302N. In this embodiment, requests are received from outside the computing system 300 by the first-tier subsystem 302A, and travel to the last-tier subsystem 302N for ultimate processing to generate responds, which travel back up to the first-tier subsystem 302A for communication back outside the system 300. The embodiment of FIG. 5 is thus presented to show that the computing system 300 can be made up of a number of separate server devices as the subsystems 302, and organized over a number of tiers.

Figure 6:
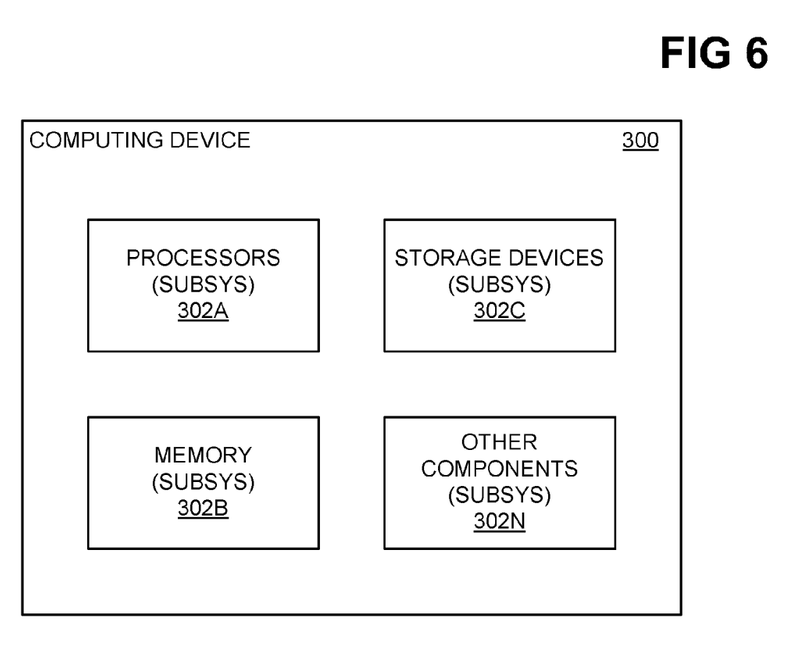

As to the latter case, FIG. 6 shows a topology for a representative computing system 300, according to another embodiment of the invention. The computing system 300 in FIG. 6 is itself a single computing device. The computing device includes processors, memory, storage devices, as well as other components. Thus, the subsystems 302 in FIG. 6 include a processor subsystem 302A, a memory subsystem 302B, a storage device subsystem 302C, as well as subsystems 302N for other components. The embodiment of FIG. 6 is presented to show that the computing system 300 can be a single computing device having a number of components that correspond to the subsystems 302 of the computing system 300.

Figure 7:
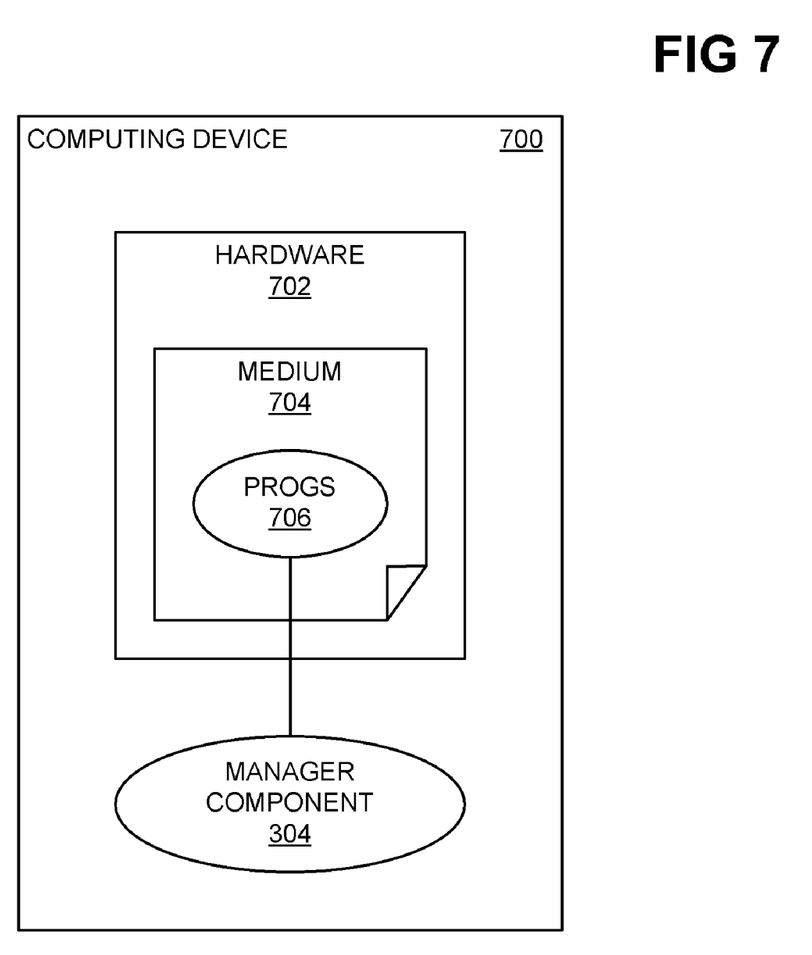
FIG. 7 is a diagram of a rudimentary computing device, according to an embodiment of the present invention.

Furthermore, FIG. 7 shows a representative rudimentary computing device 700 to specify how the manager component 304 can be implemented, according to an embodiment of the invention. The computing device 700 includes hardware 702, such as a tangible computer-readable medium 704 like a recordable data storage medium. Examples of recordable data storage media include hard disk drives and semiconductor memories, for instance. The manager component 304 is thus implemented as one or more computer programs 706 stored on the computer-readable medium 704. The programs 706 as stored on the medium 704 of the hardware 702 can be considered the means that implements the functionality that has been ascribed to the component 304.

It is finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:

performing a manage-analyze-plan-execute (MAPE) loop on a system-wide basis in relation to a plurality of subsystems of a computing system based on one or more parameters, where performing the MAPE loop results in a performance level at which each subsystem is to operate to conserve energy utilization on the system-wide basis such that the computing system still satisfies the parameters, where the MAPE loop is performed on the system-wide basis as opposed to individually for each subsystem, the subsystems being N in number;

for each subsystem as a given subsystem, communicating to the given subsystem the performance level at which the given subsystem is to operate, to cause the subsystems to operate at the performance level at a same time; and, at each subsystem as the given subsystem, operating at the performance level communicated to the given subsystem, wherein the subsystems include at least a frontend subsystem and a backend subsystem, wherein at an initial time, the frontend subsystem is required to operate at the performance level but the backend subsystem is not yet required to operate at the performance level, wherein at a later time, both the frontend subsystem and the backend subsystem are required to operate at the performance level, wherein both the frontend subsystem and the backend subsystem are nevertheless caused to operate at the performance level at the initial time, even though the backend subsystem does not have to operate at the performance level until the later time, to reduce latency, and wherein the latency in having each subsystem operate at the performance level is n, and the latency in having all the subsystems operate at the performance level at the same time is n, such that the latency is reduced because the latency in having all the subsystems operate at the performance level is n instead of N times n.

2. The method of claim 1, wherein performing the MAPE loop on the system-wide basis in relation to the plurality of subsystems of the computing system based on the parameters comprises performing the MAPE loop on the system-wide basis in relation to the plurality of subsystems of the computing system based on one or more of:

characteristics of a workload running on the computing system;

characteristics of an application computer program running on the computing system;

a required service level agreement (SLA) of the computing system;

a topology of the computing system;

a historical usage pattern of the computing system; and a network of the computing system.

3. The method of claim 1, wherein, for each subsystem of one or more subsystems of the plurality of subsystems, as the given subsystem, communicating to the given subsystem the performance level at which the given subsystem is to operate comprises:

communicating to an operating system running on the computing system the performance level at which the given subsystem is to operate; and, calling by the operating system an application programming interface (API) for the given subsystem and installed at the operating system to communicate to the given subsystem the performance level at which the given subsystem is to operate.

4. The method of claim 1, wherein, for each subsystem of one or more subsystems of the plurality of subsystems, as the given subsystem, communicating to the given subsystem the performance level at which the given subsystem is to operate comprises:

communicating to the given subsystem the performance level at which the given subsystem is to operate via a plug-in for the given subsystem.

5. The method of claim 1, further comprising, for each subsystem of one or more subsystems of the plurality of subsystems, as the given subsystem, calling an application programming interface (API) for the given subsystem by an application computer program running on the computing system so that the application computer program overrides the performance level at which the given subsystem is to operate as resulting from performing the MAPE loop.

6. The method of claim 1, further comprising repeating the method one or more times.

7. The method of claim 1, wherein the computing system is a single computing device, and each subsystem is a component of the single computing device.

8. The method of claim 1, wherein the computing system encompasses a plurality of computing devices, and each subsystem comprises one of the computing devices of the computing system.

9. A computing system comprising:

a plurality of subsystems, at least one of the plurality of subsystems implemented in hardware, the subsystems being N in number; and, a manager component to perform a manage-analyze-plan-execute (MAPE) loop on a system-wide basis in relation to the plurality of subsystems based on one or more parameters to result in a performance level at which each subsystem is to operate to conserve energy utilization on the system-wide basis such that the computing system still satisfies the parameters, and to communicate to each subsystem as a given subsystem the performance level at which the given subsystem is to operate, where the MAPE loop is performed on the system-wide basis as opposed to individually for each subsystem, wherein each subsystem, as the given subsystem, is to operate at the performance level communicated to the given subsystem by the manager component, and the subsystems are to operate at the performance level at a same time, wherein the subsystems include at least a frontend subsystem and a backend subsystem, wherein at an initial time, the frontend subsystem is required to operate at the performance level but the backend subsystem is not yet required to operate at the performance level, wherein at a later time, both the frontend subsystem and the backend subsystem are required to operate at the performance level, wherein both the frontend subsystem and the backend subsystem are nevertheless caused to operate at the performance level at the initial time, even though the backend subsystem does not have to operate at the performance level until the later time, to reduce latency, and wherein the latency in having each subsystem operate at the performance level is n, and the latency in having all the subsystems operate at the performance level at the same time is n, such that the latency is reduced because the latency in having all the subsystems operate at the performance level is n instead of N times n.

10. The computing system of claim 9, wherein the parameters comprise one or more of:
characteristics of a workload running on the computing system;
characteristics of an application computer program running on the computing system;
a required service level agreement (SLA) of the computing system;
a topology of the computing system;
a historical usage pattern of the computing system;
a network of the computing system.

11. The computing system of claim 9, further comprising an operating system,
wherein the operating system to receive for each subsystem of one or more subsystems of the plurality of subsystems, as the given subsystem, the performance level at which the given subsystem is to operate from the manager component, and the operating system is to call an application programming interface (API) for the given subsystem and installed at the operating system to communicate to the given subsystem the performance level at which the given subsystem is to operate.

12. The computing system of claim 9, further comprising, for each subsystem of one or more subsystems of the plurality of subsystems, as the given subsystem, a plug-in for the given subsystem and installed at the manager component, such that the manager component is to communicate to the given subsystem the performance level at which the given subsystem is to operate via the plug-in for the given subsystem.

13. The computing system of claim 9, further comprising, for each subsystem of one or more subsystems of the plurality of subsystems, as the given subsystem, an application programming interface (API) for the given subsystem, the API callable by an application computer program running on the computing system so that the application computer program overrides the performance level at which the given subsystem is to operate as resulting from the manager component performing the MAPE loop.

14. The computing system of claim 9, wherein the computing system is a single computing device, and each subsystem is a component of the single computing device.

15. The computing system of claim 9, wherein the computing system encompasses a plurality of computing devices, and each subsystem comprises one of the computing devices of the computing system.

16. A computing device comprising:
hardware; and,
a manager component implemented within the hardware to:
perform a manage-analyze-plan-execute (MAPE) loop on a system-wide basis in relation to a plurality of subsystems of a computing system based on one or more parameters to result in a performance level at which each subsystem is to operate to conserve energy utilization on the system-wide basis such that the computing system still satisfies the parameters, where the MAPE loop is performed on the system-wide basis as opposed to individually for each subsystem,
wherein the subsystems are N in number and are caused to operate at the performance level at the same time,
wherein the subsystems include at least a frontend subsystem and a backend subsystem,
wherein at an initial time, the frontend subsystem is required to operate at the performance level but the backend subsystem is not yet required to operate at the performance level,
wherein at a later time, both the frontend subsystem and the backend subsystem are required to operate at the performance level,
wherein both the frontend subsystem and the backend subsystem are nevertheless caused to operate at the performance level at the initial time, even though the backend subsystem does not have to operate at the performance level until the later time, to reduce latency,
and wherein the latency in having each subsystem operate at the performance level is n, and the latency in having all the subsystems operate at the performance level at the same time is n, such that the latency is reduced because the latency in having all the subsystems operate at the performance level is n instead of N times n.

17. The computing device of claim 16, wherein, for each subsystem of one or more subsystems of the plurality of subsystems, as a given subsystem, the manager component is to communicate to the given subsystem the performance level at which the given subsystem is to operate by communicating to an operating system running on the computing system the performance level at which the given subsystem is to operate,
where the operating system calls an application programming interface (API) for the given subsystem and installed at the operating system to communicate to the given subsystem the performance level at which the given subsystem is to operate.

18. The computing device of claim 16, wherein, for each subsystem of one or more subsystems of the plurality of subsystems, as the given subsystem, the manager component is to communicate to the given subsystem the performance level at which the given subsystem is to operate via a plug-in for the given subsystem and installed at the manager component.

19. An article of manufacture comprising:
a non-transitory computer-readable medium; and,
means in the medium for performing a manage-analyze-plan-execute (MAPE) loop on a system-wide basis in relation to a plurality of subsystems of a computing system based on one or more parameters, where performing the MAPE loop results in a performance level at which each subsystem is to operate to conserve energy utilization on the system-wide basis such that the computing system still satisfies the parameters, where the MAPE loop is performed on the system-wide basis as opposed to individually for each subsystem,
wherein the subsystems are N in number and are caused to operate at the performance level at the same time,
wherein the subsystems include at least a frontend subsystem and a backend subsystem,
wherein at an initial time, the frontend subsystem is required to operate at the performance level but the backend subsystem is not yet required to operate at the performance level,
wherein at a later time, both the frontend subsystem and the backend subsystem are required to operate at the performance level,
wherein both the frontend subsystem and the backend subsystem are nevertheless caused to operate at the performance level at the initial time, even though the backend subsystem does not have to operate at the performance level until the later time, to reduce latency, and wherein the latency in having each subsystem operate at the performance level is n, and the latency in having all the subsystems operate at the performance level at the same time is n, such that the latency is reduced because the latency in having all the subsystems operate at the performance level is n instead of N times n.

* * * * *